(12) United States Patent
Cha et al.

(10) Patent No.: US 12,137,857 B2
(45) Date of Patent: Nov. 12, 2024

(54) ROBOTIC CLEANER

(71) Applicant: LG ELECTRONICS INC., Seoul (KR)

(72) Inventors: Jeong Uk Cha, Seoul (KR); Yong Gil Shin, Seoul (KR); Ga Yeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 371 days.

(21) Appl. No.: 17/639,960

(22) PCT Filed: Jun. 2, 2020

(86) PCT No.: PCT/KR2020/007166
§ 371 (c)(1),
(2) Date: Mar. 3, 2022

(87) PCT Pub. No.: WO2021/060663
PCT Pub. Date: Apr. 1, 2021

(65) Prior Publication Data
US 2022/0322908 A1    Oct. 13, 2022

(30) Foreign Application Priority Data

Sep. 27, 2019    (KR) .......................... 10-2019-0119841

(51) Int. Cl.
*A47L 11/40* (2006.01)
*A47L 11/282* (2006.01)
(Continued)

(52) U.S. Cl.
CPC ......... *A47L 11/4038* (2013.01); *A47L 11/282* (2013.01); *A47L 11/4005* (2013.01);
(Continued)

(58) Field of Classification Search
CPC .............. A47L 11/4008; A47L 11/4011; A47L 11/4061; A47L 11/4083; A47L 2201/04; A47L 2201/06; G01M 1/12
See application file for complete search history.

(56) References Cited

U.S. PATENT DOCUMENTS

| | | | |
|---|---|---|---|
| 2005/0015913 A1* | 1/2005 | Kim ..................... | G05D 1/0246 15/385 |
| 2006/0185690 A1* | 8/2006 | Song ....................... | A47L 11/34 134/21 |

(Continued)

FOREIGN PATENT DOCUMENTS

| | | | | |
|---|---|---|---|---|
| AU | 2020354043 | | 3/2022 | |
| AU | 2020354043 A1 * | | 3/2022 | ............ A47L 11/14 |

(Continued)

OTHER PUBLICATIONS

International Search Report dated Sep. 1, 2020 issued in Application No. PCT/KR2020/007166.
(Continued)

*Primary Examiner* — Marc Carlson
(74) *Attorney, Agent, or Firm* — KED & ASSOCIATES, LLP

(57) ABSTRACT

The present disclosure relates to a robotic cleaner. The robotic cleaner may be configured such that an imaginary plane passing mop contact portions having a small area passes through the center of gravity of the robotic cleaner, thereby travelling while the mops effectively scrub a floor surface.

20 Claims, 14 Drawing Sheets

(51) Int. Cl.
  *G05D 1/00* (2006.01)
  *G05D 1/02* (2020.01)
  *G01M 1/12* (2006.01)

(52) U.S. Cl.
  CPC ....... *A47L 11/4008* (2013.01); *A47L 11/4011* (2013.01); *A47L 11/4061* (2013.01); *A47L 11/4069* (2013.01); *A47L 11/4083* (2013.01); *G05D 1/0214* (2013.01); *A47L 2201/04* (2013.01); *A47L 2201/06* (2013.01); *G01M 1/12* (2013.01)

(56) References Cited

U.S. PATENT DOCUMENTS

| | | | |
|---|---|---|---|
| 2014/0215735 A1* | 8/2014 | Gilbert, Jr. | B60L 15/2036 15/98 |
| 2014/0259475 A1* | 9/2014 | Doughty | A47L 11/282 15/207.2 |
| 2015/0182090 A1* | 7/2015 | Park | A47L 11/4063 15/98 |
| 2019/0038106 A1* | 2/2019 | Jang | A47L 11/24 |
| 2021/0093145 A1* | 4/2021 | Kim | A47L 11/4038 |

FOREIGN PATENT DOCUMENTS

| | | | | |
|---|---|---|---|---|
| AU | 2020356055 | | 3/2022 | |
| AU | 2020356055 A1 * | | 3/2022 | ............. A47L 11/03 |
| CN | 109715025 | | 5/2019 | |
| CN | 109715027 | | 5/2019 | |
| CN | 109715027 A * | | 5/2019 | ............. A47L 11/14 |
| KR | 10-2010-0051134 | | 5/2010 | |
| KR | 20100051134 A * | | 5/2010 | |
| KR | 10-1613446 | | 4/2016 | |
| KR | 10-1689133 | | 12/2016 | |
| KR | 10-2017-0096760 | | 8/2017 | |
| KR | 10-1903022 | | 10/2018 | |
| KR | 10-2019-0015934 | | 2/2019 | |
| KR | 20190017004 A * | | 2/2019 | |
| KR | 10-1966083 | | 4/2019 | |
| WO | WO 2015/137564 | | 9/2015 | |
| WO | WO-2015137560 A1 * | | 9/2015 | ........... A47L 9/2852 |
| WO | WO-2015137561 A1 * | | 9/2015 | ........... A47L 11/282 |
| WO | WO-2015137564 A1 * | | 9/2015 | ........... A47L 11/283 |
| WO | WO-2015186944 A1 * | | 12/2015 | ............... A47L 9/28 |
| WO | WO-2018012923 A1 * | | 1/2018 | ............. A47L 11/14 |

OTHER PUBLICATIONS

Chinese Office Action dated Oct. 24, 2022 issued in Application No. 202080066295.6.
Chinese Notice of Allowance dated May 9, 2023 issued in Application No. 202080066295.6.
Australian Office Action dated Jun. 15, 2023 issued in Application No. 2020354044.
Korean Office Action dated May 23, 2024 issued in Application No. 10-2019-0119841.

* cited by examiner

ROBOTIC CLEANER

CROSS-REFERENCE TO RELATED PATENT APPLICATIONS

This application is a U.S. National Stage Application under 35 U.S.C. § 371 of PCT Application No. PCT/KR2020/007166, filed Jun. 2, 2020, which claims priority to Korean Patent Application No. 10-2019-0119841, filed Sep. 27, 2019, whose entire disclosures are hereby incorporated by reference.

FIELD

The present disclosure relates to a robotic cleaner and, more specifically, to a robotic cleaner capable of effectively cleaning a floor surface by increasing the frictional force between a mop of the robotic cleaner and the floor surface.

BACKGROUND

Recently, with the development of industrial technology, a robotic cleaner has been developed to clean an area that is to be cleaned while travelling therethrough by itself without user manipulation. This robotic cleaner is equipped with a sensor capable of recognizing a space to be cleaned, a mop for cleaning a floor surface, and the like and may travel while scrubbing the floor surface of the space recognized by the sensor with a mop or the like.

Robotic cleaners includes a wet-type robotic cleaner capable of scrubbing a floor surface with a mop containing water to effectively remove foreign substances strongly attached to the floor surface. The wet-type robotic cleaner is equipped with a water tank, and is configured such that the water contained in the water tank is supplied to the mop and such that the mop containing water scrubs a floor surface to effectively remove foreign substances strongly attached to the floor surface.

In the wet-type robotic cleaner, the mop may have a circular shape and come into contact with a floor surface while rotating, thereby cleaning the floor surface. In addition, the robotic cleaner may be configured to travel in a specific direction using the frictional force between a plurality of rotating mops and a floor surface.

Meanwhile, the greater the frictional force between the mop and a floor surface, the more strongly the mop scrubs the floor surface, so the robotic cleaner can effectively clean the floor surface. In order to increase the frictional force between the mop and the floor surface, it is preferable to support all the weight of the robotic cleaner only by a portion where the mop is in contact with the floor surface (hereinafter referred to as a "mop contact portion"). This is due to the fact that if mop contact portions are configured to support all the weight of a robotic cleaner in the case of a robotic cleaner in which the mop contact portions have the same area, the greatest normal force may act on the mop contact portions.

In addition, in the case where all the weight of the robotic cleaner is supported only by the mop contact portion, the smaller the area of the mop contact portion, the greater the frictional force between the mop and the floor surface, thereby effectively scrubbing the floor surface. This is due to the fact that, in the case where the same load is applied to the mop contact portion, the smaller the area of the mop contact portion, the less the load is distributed, so that the normal force may act greatly.

However, in the conventional robotic cleaner, when the weight of the robotic cleaner is not supported only by the mop contact portions or is supported only by the mop contact portions, there is a problem in that the area of the mop contact portion cannot be configured to be small.

For example, Korean Patent Registration No. 10-1689133, as a prior document, discloses a robotic cleaner including a cleaner for wet cleaning and first and second rotating members in rotational contact with a floor surface to move the robotic cleaner.

Korean Patent Registration No. 10-1689133 discloses that the first and second rotating members are disposed eccentrically in a direction opposite the travelling direction of the robotic cleaner and that auxiliary wheels are provided in addition to the first and second rotating members to share the weight of the robotic cleaner. Therefore, there is a problem in that the mop contact portions fail to support all the weight of the robotic cleaner, so that the mops cannot effectively scrub a floor surface.

As another example, Korean Patent Registration No. 10-1903022, as a prior document, discloses a robotic cleaner having a first cleaning module including a left spin-mop and a right spin-mop in rotational contact with a floor surface to move the robotic cleaner, and a second cleaning module disposed in front of the first cleaning module.

Korean Patent Registration No. 10-1903022 states that the mop contact portions of the first cleaning module and the second cleaning module support all the weight of the robotic cleaner, but the second cleaning module has a larger area in contact with a floor surface, so the weight of the robotic cleaner is widely distributed, and accordingly the mops cannot effectively scrub the floor surface.

SUMMARY

An objective of the present disclosure is to solve the problem in that the mops cannot effectively scrub a floor surface due to the fact that the frictional force between the mops and the floor surface is small because the mop contact portions fail to support all the weight of the robotic cleaner.

Another objective of the present disclosure is to solve the problem in that the mops cannot effectively scrub a floor surface due to the fact that the frictional force between the mops and the floor surface is small because the area of the mop contact portions supporting the weight of the robotic cleaner is large.

Another objective of the present disclosure is to effectively arrange components provided in a limited space inside the robotic cleaner in order to configure the mop contact portions to support all the weight of the robotic cleaner.

Another objective of the present disclosure is to effectively arrange components provided in a space inside the robotic cleaner so that the robotic cleaner can travel stably while the mop contact portions support all the weight of the robotic cleaner.

Another objective of the present disclosure is to select the positions of the mop contact portions of the robotic cleaner so that the robotic cleaner can travel stably while the mop contact portions maximally support the weight of the robotic cleaner.

Another objective of the present disclosure is to adjust the positions of the mop contact portions supporting the weight of the robotic cleaner in response to a change in the position of the center of gravity of the robotic cleaner due to a change in the weight of a water tank depending on the amount of water contained in the water tank of the robotic cleaner.

The objectives of the present disclosure are not limited to the objectives mentioned above, and other objectives that are not mentioned will be clearly understood by those skilled in the art from the description below.

In order to attain the above objectives, a robotic cleaner according to an embodiment of the present disclosure may be configured to travel in the state in which mop contact portions in contact with a floor surface to support the weight of the robotic cleaner and having a small area support most of weight of the robotic cleaner.

Specifically, a robotic cleaner according to an embodiment of the present disclosure may include a main body including a base and a cover covering the base and including a battery, a water tank, and a motor inside the same, and one or more circular mop attachment plates installed on the bottom surface of the base, to/from which a mop is able to be attached/detached, configured to be rotated by the motor, and having at least a portion that comes into contact with a floor surface, wherein the mop attachment plates may include a first mop attachment plate installed on the left side to be inclined downwardly to the left with respect to a forward travelling direction when viewed from above and a second mop attachment plate installed on the right side to be inclined downwardly to the right with respect to the forward travelling direction when viewed from above, and wherein an imaginary plane, which passes through mop contact portions where the first mop attachment plate and the second mop attachment plate are in contact with the floor surface and is perpendicular to the floor surface, may pass through the center of gravity of the robotic cleaner.

In addition, in order to reduce installation area, the battery may be installed on the base such that the length thereof in a direction perpendicular to the floor surface is greater than the length thereof in a direction horizontal to the floor surface.

In addition, the battery and the water tank are installed on the base such that the center of gravity is close to the floor surface and such that the lengths thereof in a direction horizontal to the floor surface are greater than the lengths thereof in a direction perpendicular to the floor surface.

In addition, a robotic cleaner according to another embodiment of the present disclosure may include a main body including a base and a cover covering the base and including a battery, a water tank, and a motor inside the same, one or more mop attachment plates installed on the bottom surface of the base, to/from which a mop is able to be attached/detached, configured to be rotated by the motor, and having at least a portion that comes into contact with a floor surface, a moving part configured to move the mop attachment plates in a direction horizontal to the floor surface, and a controller configured to control movement of the moving part, wherein the mop attachment plates may include a first mop attachment plate installed on the left side to be inclined downwardly to the left with respect to a forward travelling direction when viewed from above and a second mop attachment plate installed on the right side to be inclined downwardly to the right with respect to the forward travelling direction when viewed from above, and wherein the controller may control the movement of the moving part such that the center of a first imaginary line connecting mop contact portions where the first mop attachment plate and the second mop attachment plate are respectively in contact with the floor surface is positioned on a second imaginary line, which passes through the center of gravity of the robotic cleaner and is perpendicular to the floor surface.

In addition, the moving part may include a moving motor and may be configured to convert the rotational motion of the moving motor into a linear motion to move the mop attachment plates.

In addition, the robotic cleaner of the present disclosure may further include an obstacle detection sensor configured to detect an obstacle in the travelling direction, a cliff sensor configured to detect a cliff in the travelling direction, and a gyro sensor configured to detect the center of gravity through the horizontal, wherein the controller may be configured to control the rotation directions of the first mop attachment plate and the second mop attachment plate on the basis of information detected by the obstacle detection sensor and the cliff sensor, and control movement of the moving part on the basis of the center of gravity detected by the gyro sensor.

Next, a robotic cleaner according to another embodiment of the present disclosure may include a main body including a base and a cover covering the base and including a battery, a water tank, and a motor inside the same, one or more circular mop attachment plates installed on the bottom surface of the base, to/from which a mop is able to be attached/detached, configured to be rotated by the motor, and having at least a portion that comes into contact with a floor surface, and wheels installed on the bottom surface of the base so as to be spaced apart from the mop attachment plates in the forward travelling direction, wherein the mop attachment plates may include a first mop attachment plate installed on the left side to be inclined downwardly to the left with respect to a forward travelling direction when viewed from above and a second mop attachment plate installed on the right side to be inclined downwardly to the right with respect to the forward travelling direction when viewed from above, and wherein an imaginary plane, which passes through mop contact portions where the first mop attachment plate and the second mop attachment plate are in contact with the floor surface and is perpendicular to the floor surface, may be configured to be spaced a predetermined distance apart from the center of gravity in a direction opposite the forward travelling direction.

Next, a robotic cleaner according to another embodiment of the present disclosure may include a main body including a base and a cover covering the base and including a battery, a water tank, and a motor inside the same, one or more circular mop attachment plates installed on the bottom surface of the base, to/from which a mop is able to be attached/detached, configured to be rotated by the motor, and having at least a portion that comes into contact with a floor surface, wheels installed on the bottom surface of the base so as to be spaced apart from the mop attachment plate in the forward travelling direction, a moving part configured to move the mop attachment plates in a direction horizontal to the floor surface, and a controller configured to control movement of the moving part, wherein the mop attachment plates may include a first mop attachment plate installed on the left side to be inclined downwardly to the left with respect to a forward travelling direction when viewed from above and a second mop attachment plate installed on the right side to be inclined downwardly to the right with respect to the forward travelling direction when viewed from above, and wherein the controller may be configured to control the movement of the moving part such that the center of a first imaginary line connecting mop contact portions where the first mop attachment plate and the second mop attachment plate are respectively in contact with the floor surface is spaced a predetermined distance apart from a second imaginary line, which passes through the center of gravity of the robotic cleaner and is perpendicular to the floor surface, in a direction opposite the forward travelling direction.

Details of other embodiments to attain the objectives will be disclosed in the detailed description and drawings.

The robotic cleaner according to the present disclosure may be configured to scrub the floor surface while the mop contact portions support all the weight of the robotic cleaner so that the frictional force between the mop and the floor surface increases, thereby providing an effect of effectively scrubbing the floor surface.

In addition, the robotic cleaner according to the present disclosure may be configured such that the mop contact portions supporting the weight of the robotic cleaner have a small area so that the frictional force between the mop and the floor surface increases, thereby providing an effect of effectively scrubbing the floor surface.

In addition, the robotic cleaner according to the present disclosure may be configured such that a heavy battery is disposed high in the vertical direction inside the robotic cleaner to control the center of gravity of the robotic cleaner, so that the mop contact portions can easily support all the weight of the robotic cleaner even in the robotic cleaner with a narrow inner space, thereby providing an effect of effectively scrubbing the floor surface.

In addition, the robotic cleaner according to the present disclosure may be configured such that wheels are provided on the bottom surface of the robotic cleaner and such that the mop contact portions are positioned to be closely spaced apart from the vertical axis of the center of gravity of the robotic cleaner in a direction opposite the travelling direction of the robotic cleaner, thereby enabling stable travelling of the robotic cleaner while the mop contact portions maximally support all the weight of the robotic cleaner.

In addition, the robotic cleaner according to the present disclosure may be configured such that a heavy battery and a water tank are disposed to have a lower center of gravity inside the robotic cleaner so that the center of gravity of the robotic cleaner is lowered, thereby providing an effect of increasing the restoring force so that the robotic cleaner can stably travel while supporting the weight thereof only by the mop contact portions even if the robotic cleaner shakes while travelling.

In addition, the robotic cleaner according to the present disclosure may be configured such that the position of the mop contact portion is adjusted as the water contained in the water tank of the robotic cleaner is consumed, thereby providing an effect of effectively scrubbing the floor surface over the operation time of the robotic cleaner.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
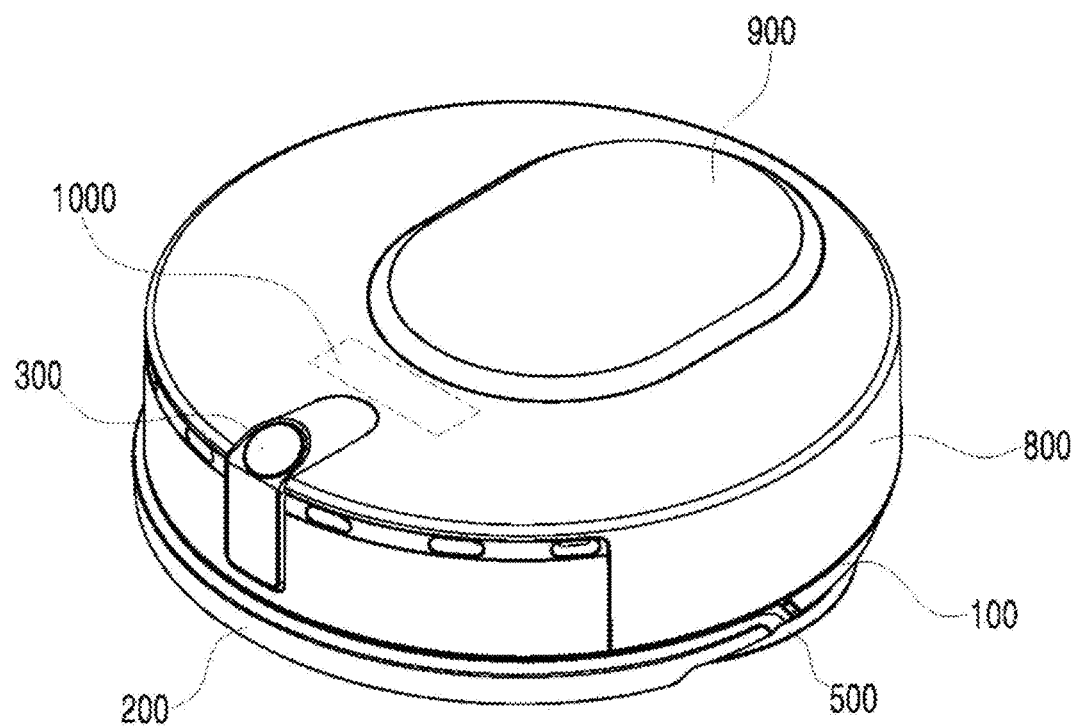
FIG. 1 is a view illustrating an example of a cleaner of the present disclosure.

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. Like reference numerals designate like elements throughout the specification. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

Hereinafter, the basic structure of a robotic cleaner according to the embodiment of the present disclosure will be described. FIG. 1 is a view illustrating an example of a robotic cleaner of the present disclosure, and FIG. 2 is a plan view illustrating the inside of the robotic cleaner shown in FIG. 1.

Figure 2:
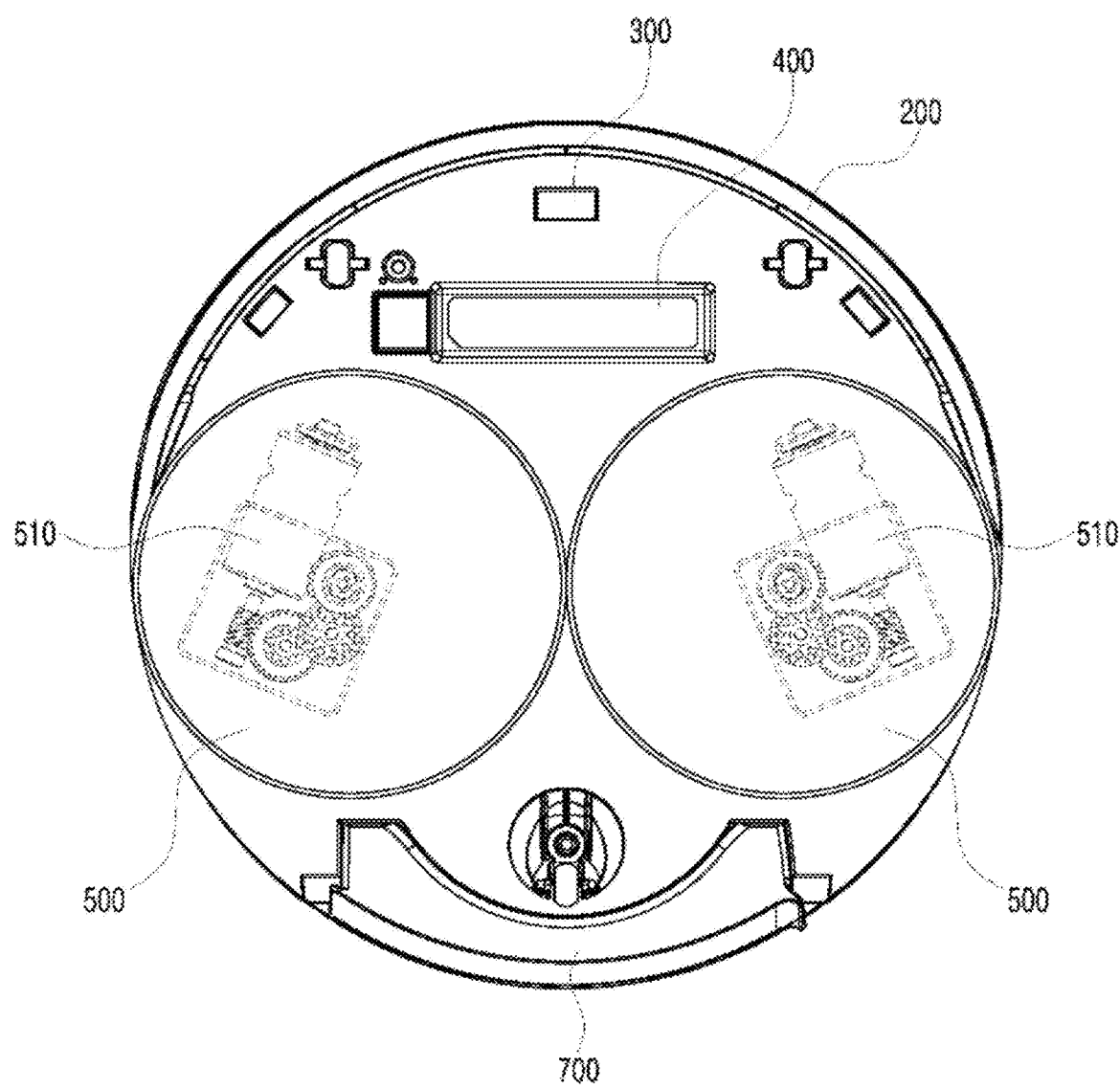
FIG. 2 is a plan view illustrating the inside of the robotic cleaner shown in FIG. 1.

Referring to FIGS. 1 and 2, a robotic cleaner 1 of the present disclosure may include a base 100, a bumper 200, a sensor unit 300, a battery 400, a mop part 500, a rolling part 600, a water tank 700, a cover 800, a display part 900, a manipulation part 1000, a controller 1100, and a moving part 1200.

First, the configuration of the base 100 will be described with reference to FIGS. 1 and 2.

The base 100 may have components of the robotic cleaner 1 installed thereon, and have the shape enabling the robotic cleaner 1 to effectively move through a space required to be cleaned and clean the same. For example, the base 100 may have a disk shape in order for the robotic cleaner 1 to not be caught between the structures disposed in the cleaning space.

Next, the configuration of the bumper 200 will be described with reference to FIGS. 1 and 2.

The bumper 200 may be configured to absorb shock on impact driving due to collision with any structure disposed in a cleaning space while the robotic cleaner 1 is moving for cleaning, and may be installed on the base 100 so as to surround a portion of the outer circumference of the base 100. For example, the bumper 200 may be made of rubber in a shape in which a part of a ring is cut away and may be installed to be connected to the base 100 with an elastic member such as a spring therebetween.

Next, the configuration of the sensor unit 300 will be described.

Figure 3:
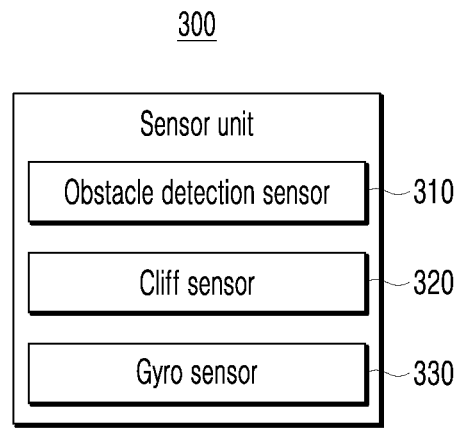
FIG. 3 is a block diagram illustrating a sensor unit of the robotic cleaner shown in FIG. 1.

FIG. 3 is a block diagram illustrating the sensor unit of the robotic cleaner shown in FIG. 1.

Referring to FIG. 3, the sensor unit 300 may include a conventional obstacle detection sensor 310 including a camera or the like and capable of detecting obstacles in the travelling direction of the robotic cleaner 1. The obstacle detection sensor 310 may be installed on the base 100 to face in a forward traveling direction of the robotic cleaner 1 so as to detect the forward traveling direction.

In addition, the sensor unit 300 may include a conventional cliff sensor 320 capable of detecting a cliff, such as a step, which has a different height in the travelling direction of the robotic cleaner 1. The cliff sensor 320 may be installed at the front of the bottom surface of the base 100 so as to be close to the outer circumference of the base 100.

In addition, the sensor unit 300 may include a conventional gyro sensor 330 capable of detecting the movement direction of the robotic cleaner 1 or horizontality. It is possible to obtain information about the center of gravity of the robotic cleaner 1 using the gyro sensor 300. For example, in the case where the robotic cleaner 1 is in a horizontal state to the floor surface, it may be determined that an imaginary surface perpendicular to the floor surface from the support point supporting the robotic cleaner 1 on the floor surface passes through the center of gravity of the robotic cleaner 1.

Next, the configuration of the battery 400 will be described.

The battery 400 may be configured as a conventional secondary battery that is rechargeable and may supply power necessary for the operation of the robotic cleaner 1. In addition, since the battery 400 is one of the heavy components among the components constituting the robotic cleaner 1, disposition thereof on the base 100 may be controlled to adjust the center of gravity of the robotic cleaner 1.

For example, referring to FIG. 2, the battery 400 may be installed in the front region on the base 100 (hereinafter referred to as "forward") with respect to the points supporting the robotic cleaner 1 from the floor surface (hereinafter referred to as "support points") in the forward travelling direction of the robotic cleaner 1 so as to make balance of weight with the components installed in the rear region on the base 100 with respect to the support points (hereinafter referred to as "backwards") in the forward travelling direction of the robotic cleaner 1.

Next, the configuration of the mop part 500 will be described.

The mop part 500 may perform functions of scrubbing a floor surface while supporting the weight of the robotic cleaner 1 and driving the robotic cleaner 1.

Figure 4:
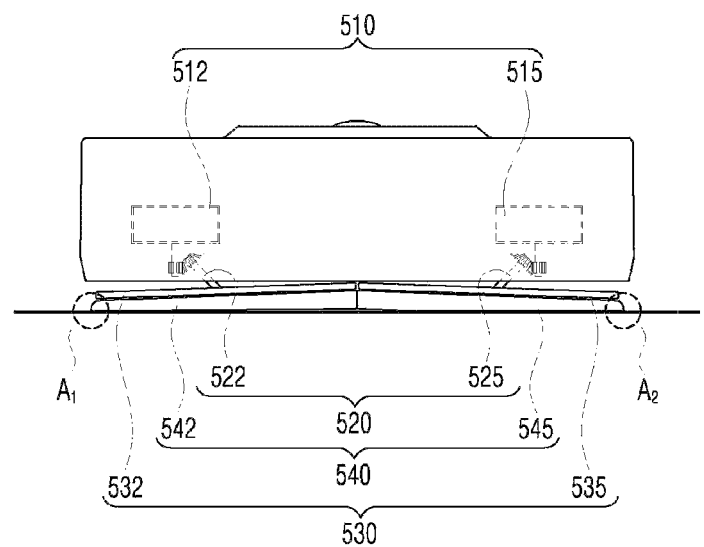
FIG. 4 is a front view illustrating an example of a mop part of the robotic cleaner shown in FIG. 1.
Figure 5:
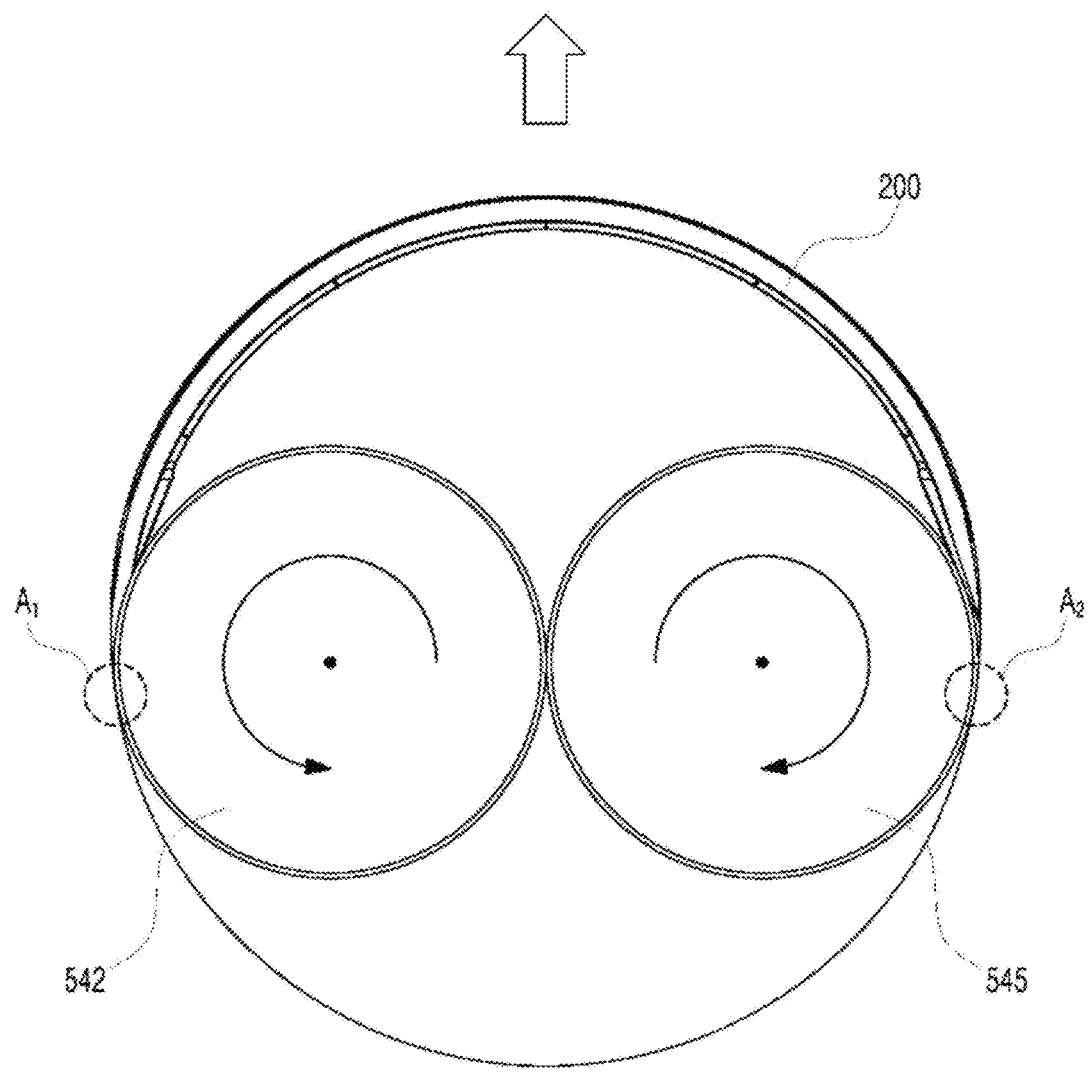
FIG. 5 is a view illustrating a state in which the robotic cleaner shown in FIG. 1 travels by rotation of the mop part shown in FIG. 4.

FIG. 4 is a front view illustrating an example of a mop part of the robotic cleaner shown in FIG. 1, and FIG. 5 is a view illustrating a state in which the robotic cleaner shown in FIG. 1 travels by rotation of the mop part shown in FIG. 4

For example, referring to FIGS. 4 and 5, the mop part 500 may include a pair of circular mop attachment plates 530, a pair of motors 510, and a pair of mops 540.

Specifically, referring to FIG. 4, the mop attachment plates 530 may be installed on the bottom surface of the base 100, and include a first mop attachment plate 535 installed on the left side of the base 100 to be inclined downwardly with respect to the forward travelling direction when viewed from above, and a second mop attachment plate 532 installed on the right side thereof to be inclined downwardly to the right with respect to the forward travelling direction when viewed from above.

The first and second mop attachment plates 535 and 532 may be configured such that a first mop 545 and a second mop 542 are detachably attached to the bottom surface, respectively, and the first mop 545 and the second mop 542 may come into contact with a floor surface (see A2 and A1) in a small area, thereby supporting the weight of the robotic cleaner 1.

In addition, the first and second mop attachment plates 535 and 532 may be respectively connected to a first motor 515 and a second motor 512 through bevel gears or the like so as to be rotated by the rotation of the first and second motors 515 and 512.

The first and second motors 515 and 512 may have different rotation speeds and directions. Therefore, the rotation speeds and directions of the first and second mop attachment plates 535 and 532 receiving the rotational force from the first and second motors 515 and 512 may vary. The robotic cleaner 1 may travel freely by adjusting the rotation speeds and directions of the first and second mop attachment plates 535 and 532.

For example, referring to FIG. 5, in the case where the first mop attachment plate 535 rotates clockwise and the second mop attachment plate 532 rotates counterclockwise when the base 100 is viewed from the bottom, the first mop 545 and the second mop 542 may push the robotic cleaner 1 forward through frictional force at the portions A2 and A1 in contact with the floor surface, respectively. Accordingly, the robotic cleaner 1 may travel forward.

In the case where the rotation speed of the first mop attachment plate 535 rotating clockwise is greater than the rotation speed of the second mop attachment plate 532 rotating counterclockwise, the distance at which the robotic cleaner 1 is pushed at the portion A2 where the first mop 545 is in contact with floor surface is greater than the distance at which the robotic cleaner 1 is pushed at the portion A1 where the second mop 542 is in contact with the floor surface. In that case, the robotic cleaner 1 may move forward and turn to the right.

Under the same principle, the rotation speeds or directions of the first and second mop attachment plates 535 and 532 may be changed so that the robotic cleaner 1 may travel freely in all horizontal directions on the floor surface.

Next, the configuration of the rolling part 600 will be described.

Figure 6:
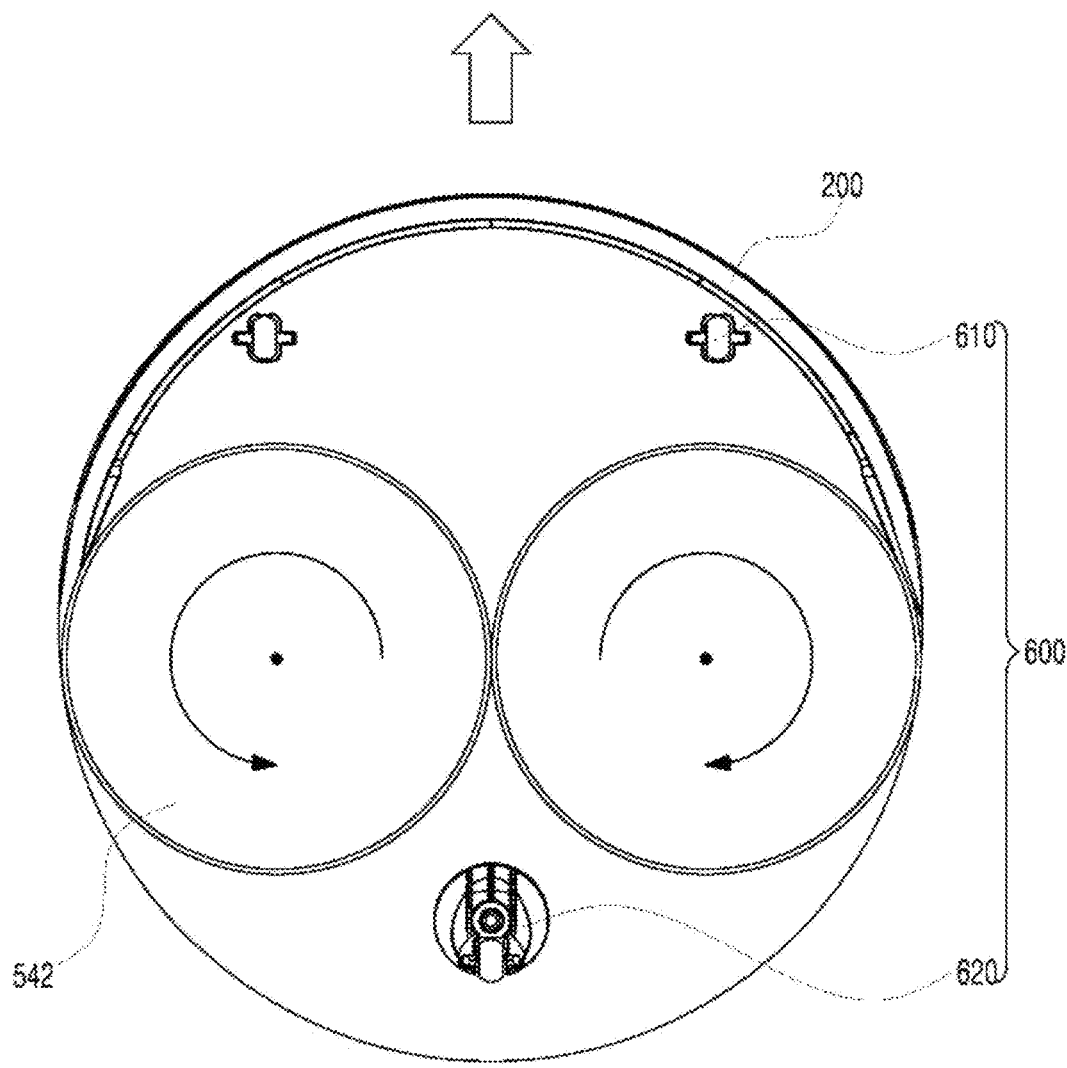
FIG. 6 is a bottom view illustrating the robotic cleaner having a rolling part shown in FIG. 1.

FIG. 6 is a bottom view illustrating the robotic cleaner having a rolling part shown in FIG. 1.

Referring to FIG. 6, the rolling part 600 may perform rolling motion while supporting partial weight of the robotic cleaner 1 so that the robotic cleaner 1 may drive smoothly, and may include wheels 610 and a caster 620.

For example, the wheel 610 may be configured as a conventional wheel installed in combination with a rotation shaft at the front of the bottom surface of the base 100 so as to rotate, and the caster 620 may be configured as a conventional caster provided with a wheel capable of rolling motion while rotating in all horizontal directions and installed at the rear of the bottom surface of the base 100.

Next, the configuration of the water tank 700 will be described.

The water tank 700 may contain water therein and has an inlet through which water is introduced and an outlet through which water is discharged. The water tank 700 may be detachably installed to the base 100 and supply water contained therein to the first and second mops 545 and 542. For example, the water tank 700 may be configured to supply water contained therein to the first and second mops 545 and 542 by pumping the water through driving of a conventional motor and a water pump installed in the base 100.

In addition, the water tank 700 is one of the heavy components among the components constituting the robotic cleaner 1, so disposition thereof on the base 100 may be controlled to adjust the center of gravity of the robotic cleaner 1.

Figure 7:
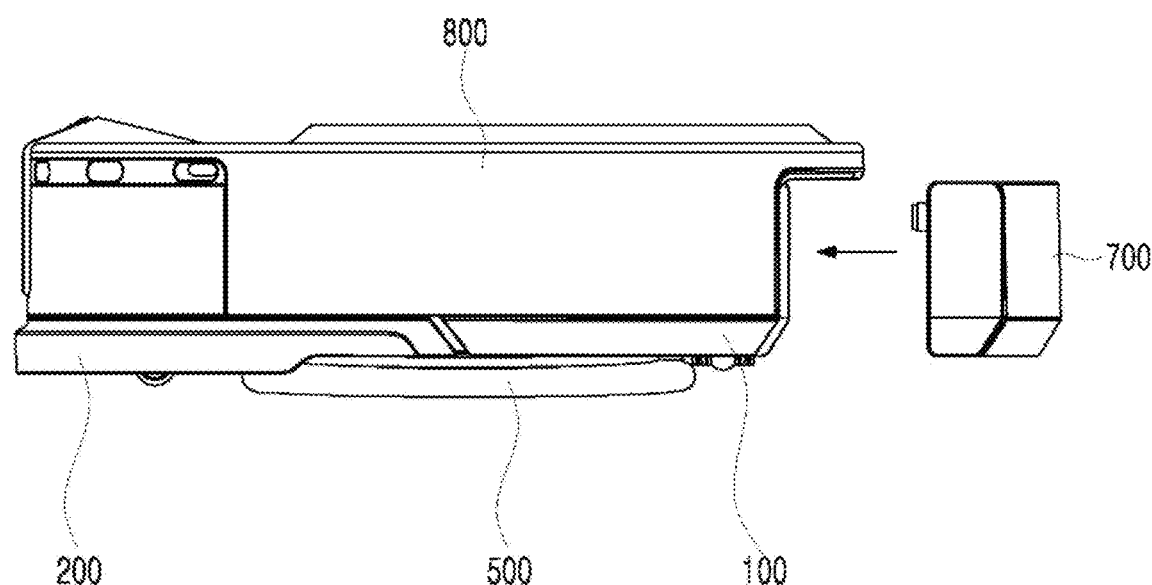
FIG. 7 is a view illustrating a water tank coupled to the robotic cleaner shown in FIG. 1.

FIG. 7 is a view illustrating a water tank coupled to the robotic cleaner shown in FIG. 1.

For example, referring to FIG. 7, the water tank 700 may be installed in the rear region on the base 100 with respect to the support points to make a balance of weight with the components, which are installed in the front region on the base 100 with respect to the support points, on the basis of the support points.

Next, the configuration of the cover 800, the display part 900, and the manipulation part 1000 will be described.

Referring to FIG. 1, the cover 800 may cover the base 100 to protect the components installed on the base 100 and decorate the exterior of the robotic cleaner 1.

For example, if the base 100 has a disk shape, the cover 800 may have a hollow cylindrical shape with an opening at the bottom so as to be coupled to the upper surface of the base 100.

In addition, the display part 900 may be configured as a conventional display panel or the like to display information such as operation time information, battery power information, etc. of the robotic cleaner 100, and may be installed on the cover 800 to facilitate a user to recognize information displayed thereon.

For example, referring to FIG. 1, the display part 900 may be installed on the upper surface of the cover 800, thereby enabling the user who viewing the robotic cleaner 1 from a higher position than the robotic cleaner 1 to easily recognize information displayed on the display part 900.

The manipulation part 1000 may be configured as a conventional button, touch panel, or the like, so that a user may input commands regarding the operation of the robotic cleaner 1 by touching or pressing the same with a certain force.

For example, Referring to FIG. 1, the manipulation part 1000 may be installed on the upper surface of the cover 800 and configured such that the user may press the same to turn on or off the power of the robotic cleaner 1.

Next, the configuration of the controller 1100 will be described.

The controller 1100 may control components related to the operation of the robotic cleaner 1, and may be configured as a conventional microcomputer or the like.

Figure 8:
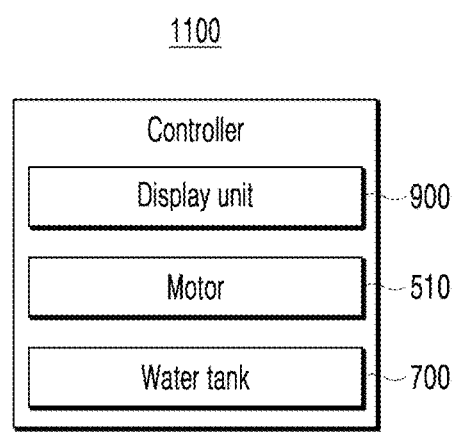
FIG. 8 is a block diagram illustrating a controller of the robotic cleaner shown in FIG. 1.

FIG. 8 is a block diagram illustrating a controller of the robotic cleaner shown in FIG. 1.

For example, referring to FIG. 8, a controller 1100 may control the display part 900 to display information, control the rotation speed or direction of the motor 510, and control the amount of water contained in the water tank 700 to be supplied to the first and second mops 545 and 542.

In addition, the controller 1100 may control movement of a moving part 1200, which will be described later.

Next, a configuration of the moving part 1200 will be described.

The moving part 1200 may move the mop attachment plates 530 in the horizontal direction of a floor surface. For example, the moving part 1200 may move the first and second mop attachment plates 535 and 532 while the imaginary line connecting the portion A2 where the first mop attachment plate 535 is in contact with the floor surface and the portion A1 where the second mop attachment plate 532 is in contact with the floor surface is perpendicular to the forward travelling direction of the robotic cleaner 1.

Figure 9:
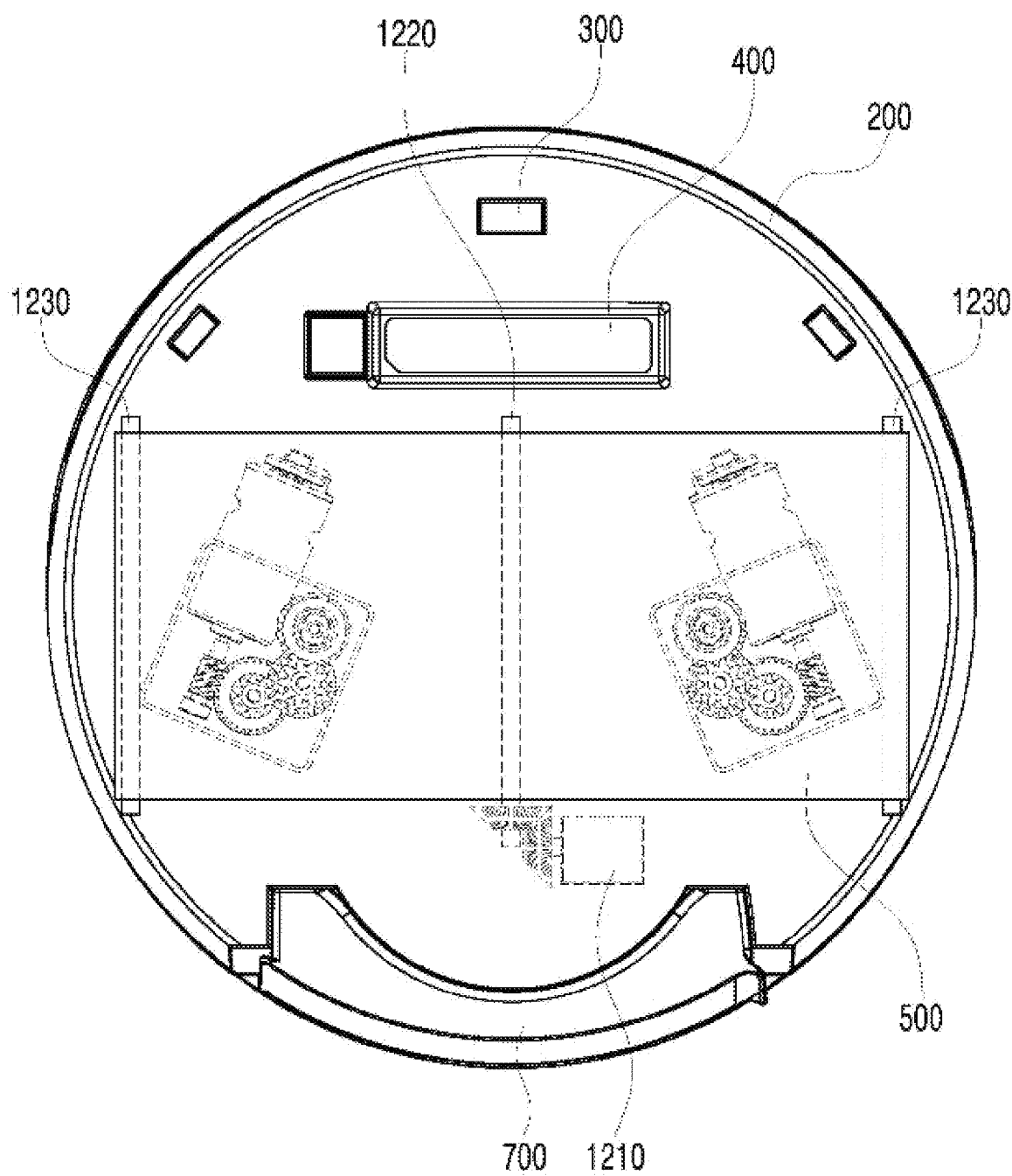
FIG. 9 is a plan view illustrating an example of a moving part provided inside the robotic cleaner shown in FIG. 1.
Figure 10:
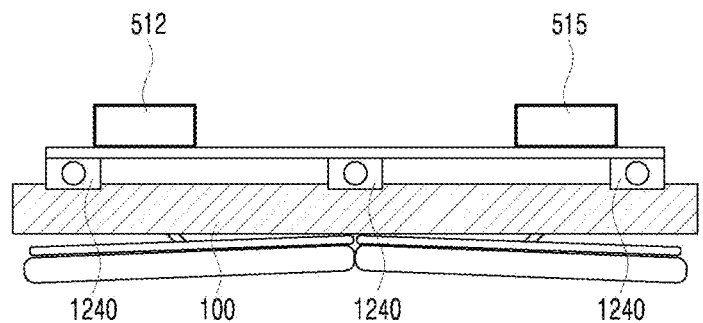
FIG. 10 is a front view illustrating an example in which a moving part is seated on a base of the robotic cleaner shown in FIG. 1.

FIG. 9 is a plan view showing an example of a moving part provided inside the robotic cleaner shown in FIG. 1, and FIG. 10 is a front view illustrating an example in which a moving part is seated on a base of the robotic cleaner shown in FIG. 1.

The moving part 1200 may adopt a conventional configuration capable of moving the device in a horizontal direction. For example, referring to FIGS. 9 and 10, the moving part 1200 may be configured to include a plate to which the first and second mop attachment plates 535 and 532 and the first and second motors 515 and 512 are attached, a motor 1210, a rotation rod 1220, guide rods 1230, and guide frames 1240.

Specifically, the plate may include a plurality of guide frames 1240 formed to be long in the longitudinal direction and having a hole formed in the lower portion thereof, and the guide frame 1240 may slide in the horizontal direction along a guide groove formed on the base 100 longitudinally in the front-rear direction. The holes formed in some guide frames 1240 may have a female thread formed on the inner circumferential surface thereof.

In addition, the guide rod 1230 installed longitudinally in the front-rear direction on the base 100 and the rotation rod 1220 installed to be rotatable longitudinally in the front-rear direction on the base 100 may be inserted into the guide frame 1240. The rotation rod 1220 may have a male thread formed on the outer circumferential surface thereof, and the guide frame 1240 into which the rotation rod 1220 is inserted may have a female thread formed on the inner circumferential surface thereof.

The motor 1210 may be installed on the base 100 and connected to the rotation rod 1220 by a bevel gear or the like to rotate the rotation rod 1220. As the rotation rod 1220 rotates, the guide frame 1240 screwed to the rotation rod may move the plate in the front-rear direction.

Hereinafter, a specific embodiment of the robotic cleaner of the present disclosure will be described.

First, the configuration of a robotic cleaner 1 according to a first embodiment of the present disclosure will be described.

The robotic cleaner 1 according to the first embodiment of the present disclosure may be configured such that mop contact portions having a small area may support all the weight of the robotic cleaner 1 through arrangement of the battery 400, the water tank 700, and the mop attachment plates 530.

Figure 11:
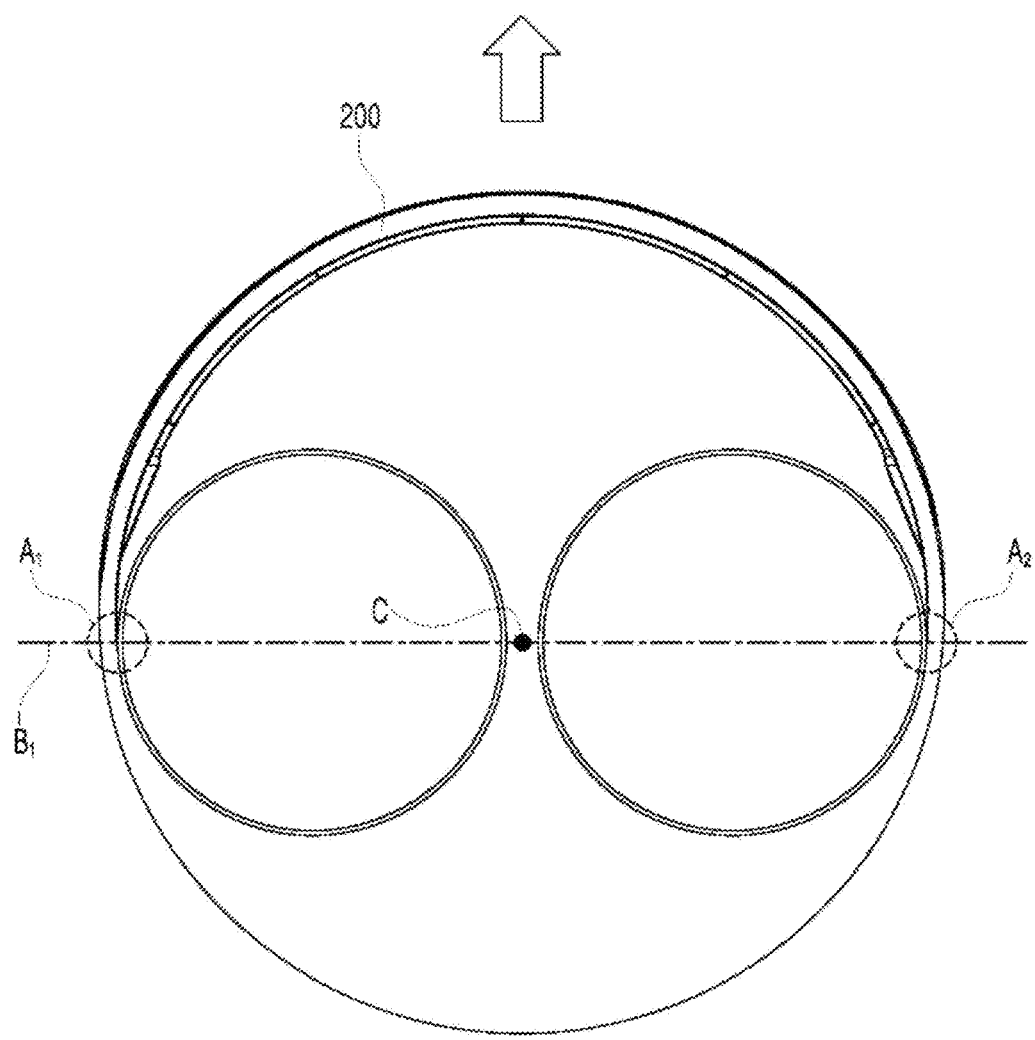
FIG. 11 is a bottom view illustrating a robotic cleaner according to a first embodiment of the present disclosure in which an imaginary plane, which passes through mop contact portions and is perpendicular to a floor surface, passes through a center of gravity.

FIG. 11 is a bottom view illustrating a robotic cleaner according to a first embodiment of the present disclosure in which an imaginary plane, which passes through mop contact portions and is perpendicular to a floor surface, passes through a center of gravity.

For example, referring to FIG. 11, the battery 300 may be installed at the front of the base 100 and the water tank 700 may be installed at the rear thereof, so that the center of gravity C of the robotic cleaner 1 may be positioned on an imaginary line perpendicular to a floor surface.

In addition, the battery 300, the water tank 700, and the mop attachment plates 530 may be installed on the base 100 such that an imaginary plane B1, which passes through the mop contact portions A2 and A1 where the first mop attachment plate 535 and the second mop attachment plate 532 are in contact with the floor surface and is perpendicular to the floor surface, passes through the center of gravity C, thereby operating the robotic cleaner 1 while the mop contact portions having a small area support all the weight of the robotic cleaner 1.

The configuration in which the mop contact portions A2 and A1 support all the weight of the robotic cleaner 1 as described above may be expressed differently. For example, it may be expressed that the center of a first imaginary line connecting the mop contact portions A2 and A1 where the first mop attachment plate and the second mop attachment plate are respectively in contact with the floor surface is positioned on a second imaginary line passing through the center of gravity of the robotic cleaner and perpendicular to the floor surface.

Subsequently, the configuration of a robotic cleaner 1 according to a second embodiment of the present disclosure will be described.

Although the robotic cleaner 1 according to the second embodiment of the present disclosure may be configured the same as the robotic cleaner 1 according to the first embodiment of the present disclosure, it may be configured to facilitate arrangement of the components of the robotic cleaner 1 by limiting the configuration in which the battery 300 is installed.

Figure 12:
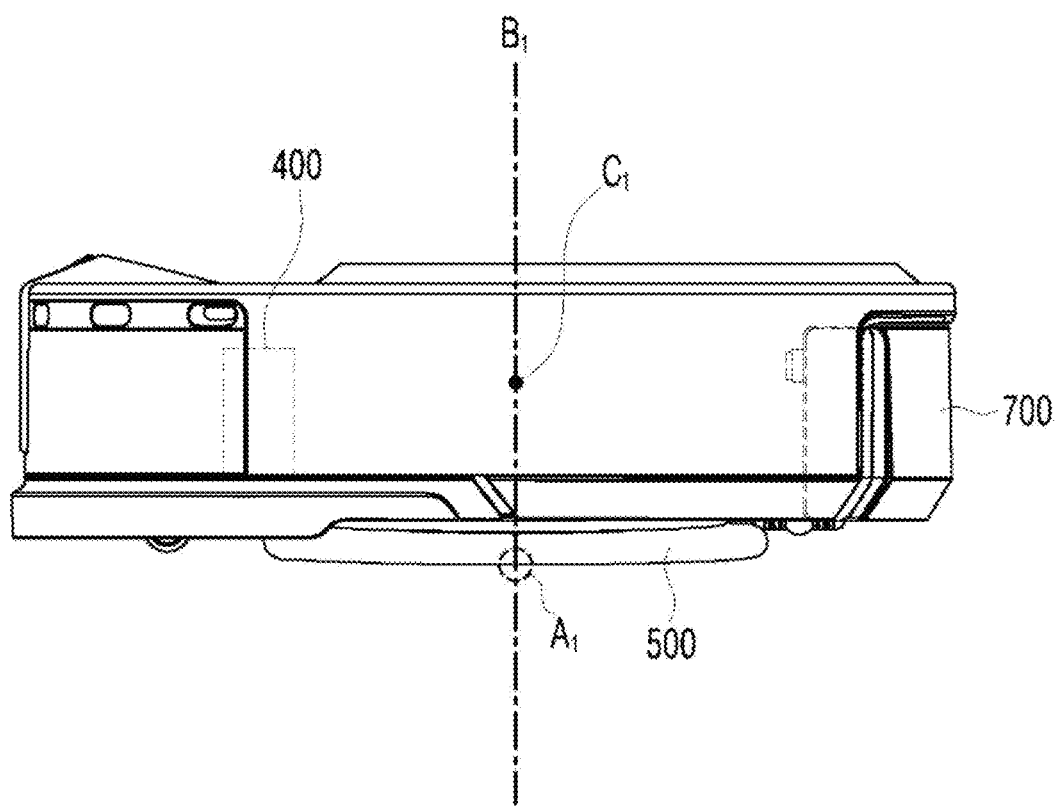
FIG. 12 is a view illustrating a robotic cleaner according to a second embodiment of the present disclosure in which a battery of the robotic cleaner shown in FIG. 11 is disposed to be higher in the vertical direction.

FIG. 12 is a view illustrating a robotic cleaner according to a second embodiment of the present disclosure in which a battery of the robotic cleaner in FIG. 11 is disposed to be higher in the vertical direction.

For example, referring to FIG. 12, the battery 400 may be installed such that the length thereof in a direction perpendicular to a floor surface is greater than the length thereof in a direction horizontal to the floor surface in order to reduce the installation area of the battery 400 on the base 100. The robotic cleaner 1 may be configured to have a small volume in some cases, and it is possible to configure the robotic cleaner 1 even having a narrow inner space so as to easily support all the weight of the robotic cleaner 1 by the mop contact portions through installation of the battery 400 as described above.

Next, the configuration of the robotic cleaner 1 according to a third embodiment of the present disclosure will be described.

Although the robotic cleaner 1 according to the third embodiment of the present disclosure may be configured the same as the robotic cleaner 1 according to the first embodiment of the present disclosure, the configuration of installation of the battery 300 and the water container 700 is limited to promote the travelling stability of the robotic cleaner 1.

Figure 13:
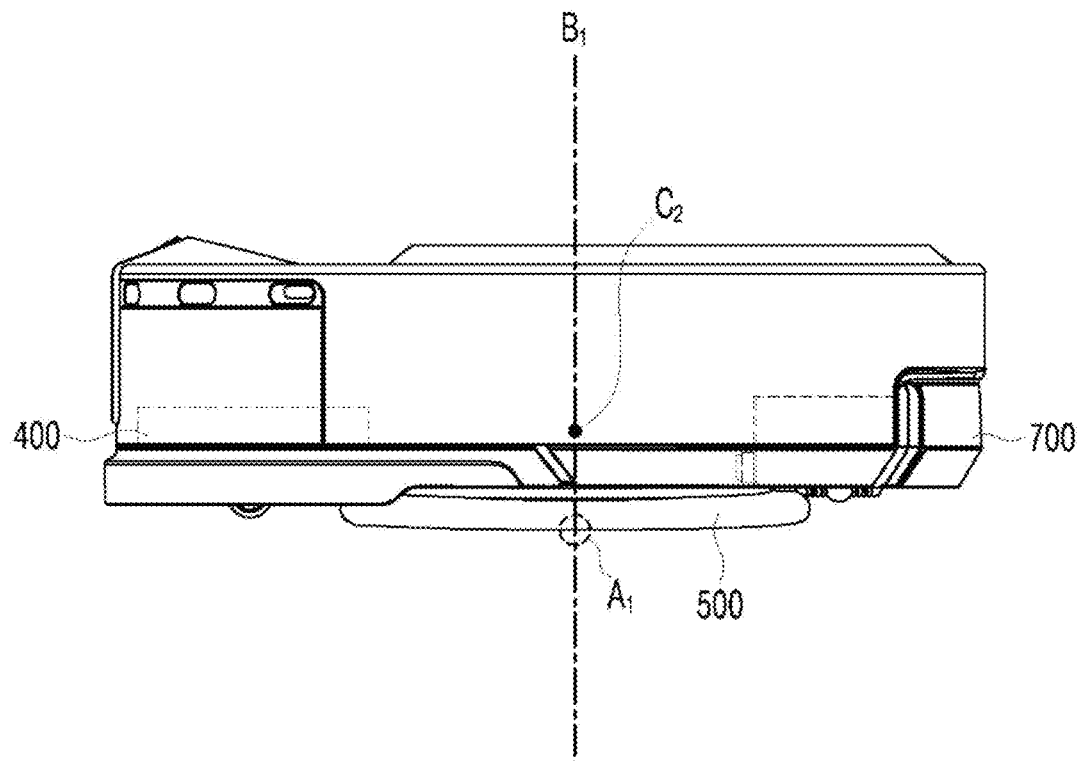
FIG. 13 is a view illustrating a robotic cleaner according to a third embodiment of the present disclosure in which a battery and a water tank of the robotic cleaner shown in FIG. 11 are disposed in the horizontal direction to be lower.

FIG. 13 is a view illustrating a robotic cleaner according to a third embodiment of the present disclosure in which a battery and a water tank of the robotic cleaner shown in FIG. 11 are disposed to be lower in the horizontal direction.

For example, referring to FIG. 13, the battery 400 and the water tank 700 may be installed on the base 100 such that the lengths thereof in a direction horizontal to a floor surface are greater than the lengths thereof in a direction perpendicular to the floor surface so that the center of gravity of the battery 400 and the center of gravity of the water tank 700 get closer to the floor surface. Accordingly, the center of gravity C2 of the robotic cleaner 1 may be lowered to be close to the floor surface.

The robotic cleaner 1 according to the embodiment of the present disclosure may be configured to maximally support the weight of the robotic cleaner 1 only by the mop contact portions having a small area. Therefore, when the robotic cleaner 1 travels on an uneven floor surface or receives an external force, it may be tilted in a specific direction or overturned.

Accordingly, if the center of gravity of the robotic cleaner 1 is lowered, the restoring force may be improved so that the robotic cleaner 1 may not be tilted easily, so the robotic cleaner 1 may be configured to travel stably by installing the battery 400 and the water container 700 as described above.

Next, the configuration of a robotic cleaner 1 according to a fourth embodiment of the present disclosure will be described.

Figure 14:
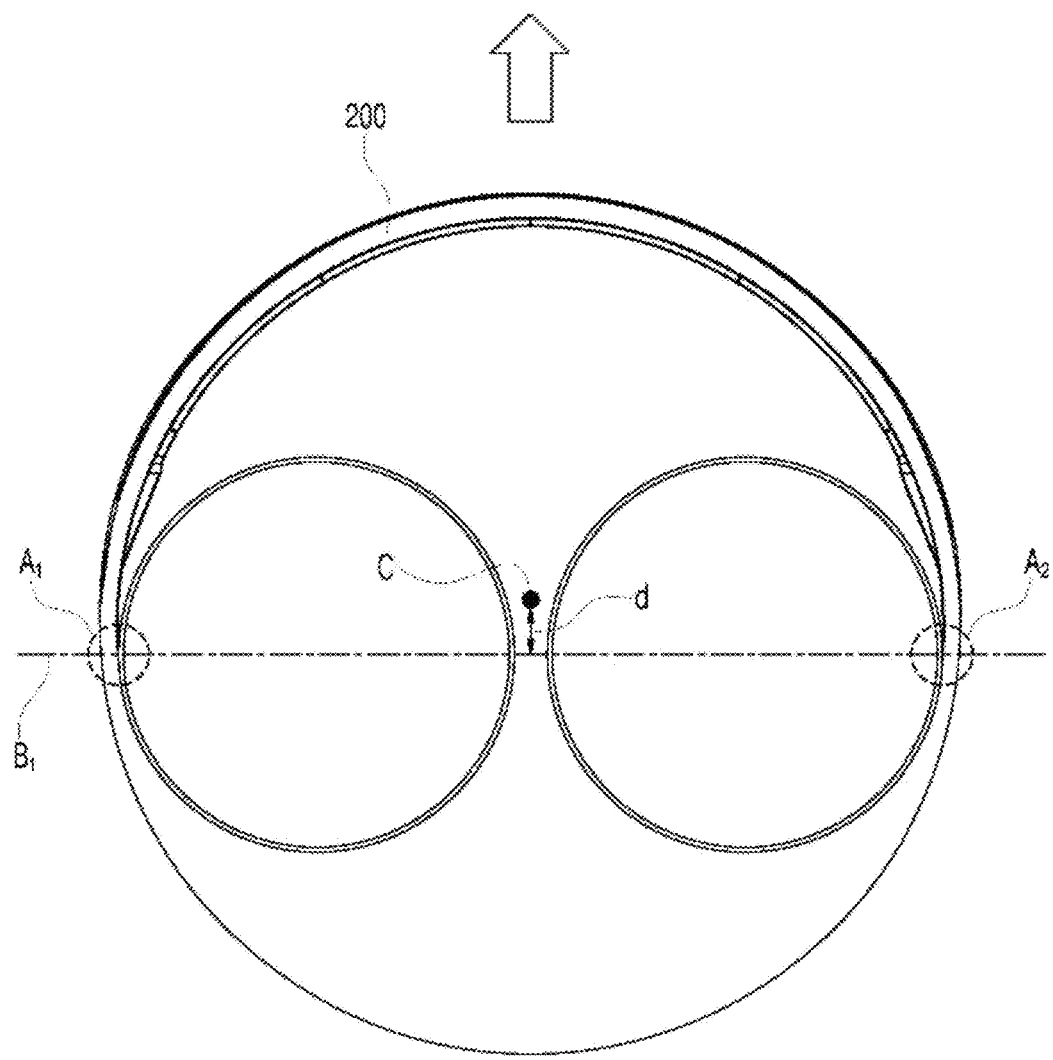
FIG. 14 is a bottom view illustrating a robotic cleaner according to a fourth embodiment of the present disclosure, which is configured such that a vertical imaginary plane passing through mop contact portions is spaced a predetermined distance apart from the center of gravity.

FIG. 14 is a bottom view illustrating a robotic cleaner according to a fourth embodiment of the present disclosure, which is configured such that a vertical imaginary plane passing through mop contact portions is spaced a predetermined distance apart from the center of gravity.

Referring to FIG. 14, the robotic cleaner 1 according to the fourth embodiment of the present disclosure may have a battery 300 installed at the front of the base 100 and a water container 700 installed at the rear thereof, so that the center of gravity C of the robotic cleaner 1 may be positioned on an imaginary line perpendicular to a floor surface.

In addition, the battery 300, the water bottle 700, and the mop attachment plates 530 may be installed such that an imaginary plane B1, which passes through the mop contact portions A2 and A1 where the first mop attachment plate 535 and the second mop attachment plate 532 are in contact with the floor surface and is perpendicular to the floor surface, is spaced a predetermined distance apart from the center of gravity C in a direction opposite the forward travelling direction. For example, the predetermined distance may be 7.5 mm.

With the configuration described above, the robotic cleaner 1 may travel stably while both the mop contact portions and the rolling part 600 support the weight of the robotic cleaner 1, and the mop contact portions may support most of weight of the robotic cleaner 1, thereby strongly scrubbing the floor surface.

Next, the configuration of a robotic cleaner 1 according to a fifth embodiment of the present disclosure will be described.

Although the robotic cleaner 1 according to the fifth embodiment of the present disclosure may be configured the same as the robotic cleaner 1 according to the first embodiment of the present disclosure, it may be configured such that the mop contact portions are shifted in consideration of the position of the center of gravity that changes depending on the water tank 700 that becomes light as water is consumed according to the operation of the robotic cleaner 1.

Figure 15:
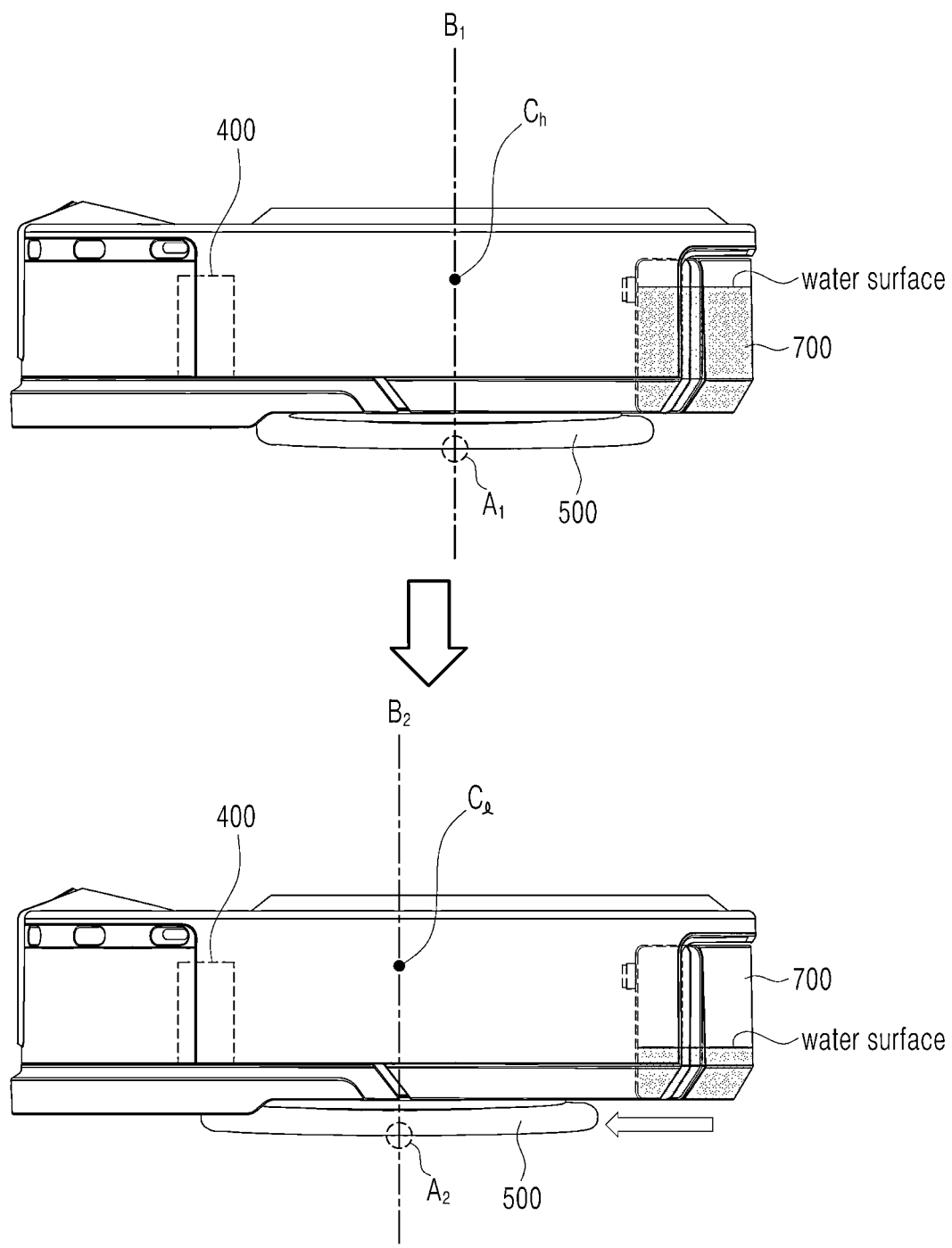
FIG. 15 is a side view illustrating a robotic cleaner according to a fifth embodiment of the present disclosure having a moving part, which is configured such that a vertical imaginary plane passing through mop contact portions passes through the center of gravity.

FIG. 15 is a side view illustrating a robotic cleaner according to a fifth embodiment of the present disclosure having a moving part, in which a vertical imaginary plane passing through a mop contact portion passes through the center of gravity.

For example, referring to FIG. 15, in the case where there is much water contained in the water tank 700, the controller 1100 may control the moving part 1200 to move the mop attachment plates 530 such that an imaginary plane B1, which passes through the mop contact portions where the first mop attachment plate 535 and the second mop attachment plate 532 are in contact with a floor surface and is perpendicular to the floor surface, passes through the center of gravity $C_h$ of the robotic cleaner 1.

If the water contained in the water tank 700 is reduced according to the operation of the robotic cleaner 1, the water tank 700 becomes light so that the robotic cleaner 1 may have a new center of gravity $C_1$ shifted forward.

In this case, the controller 1100 may control the moving part 1200 to move the mop attachment plates 530 such that an imaginary plane B2, which passes through the mop contact portions where the first mop attachment plate 535 and the second mop attachment plate 532 are in contact with the floor surface and is perpendicular to the floor surface, passes through the new center of gravity $C_1$ of the robotic cleaner 1 shifted forward.

The position of the center of gravity $C_h$, or $C_1$ of the robotic cleaner 1 may be detected by the gyro sensor 330 or the like.

With the configuration described above, even if the position of the center of gravity of the robotic cleaner 1 changes because the water in the water tank 700 is consumed by the operation of the robotic cleaner 1, the mop contact portions may support all the weight of the robotic cleaner 1, thereby effectively cleaning the floor surface.

Next, the configuration of a robotic cleaner 1 according to a sixth embodiment of the present disclosure will be described.

Although the robotic cleaner 1 according to the sixth embodiment of the present disclosure may be configured the same as the robotic cleaner 1 according to the fourth embodiment of the present disclosure, it may be configured such that the mop contact portions are shifted in consideration of the position of the center of gravity that changes depending on the water tank 700 that becomes light as water is consumed according to the operation of the robotic cleaner 1.

Figure 16:
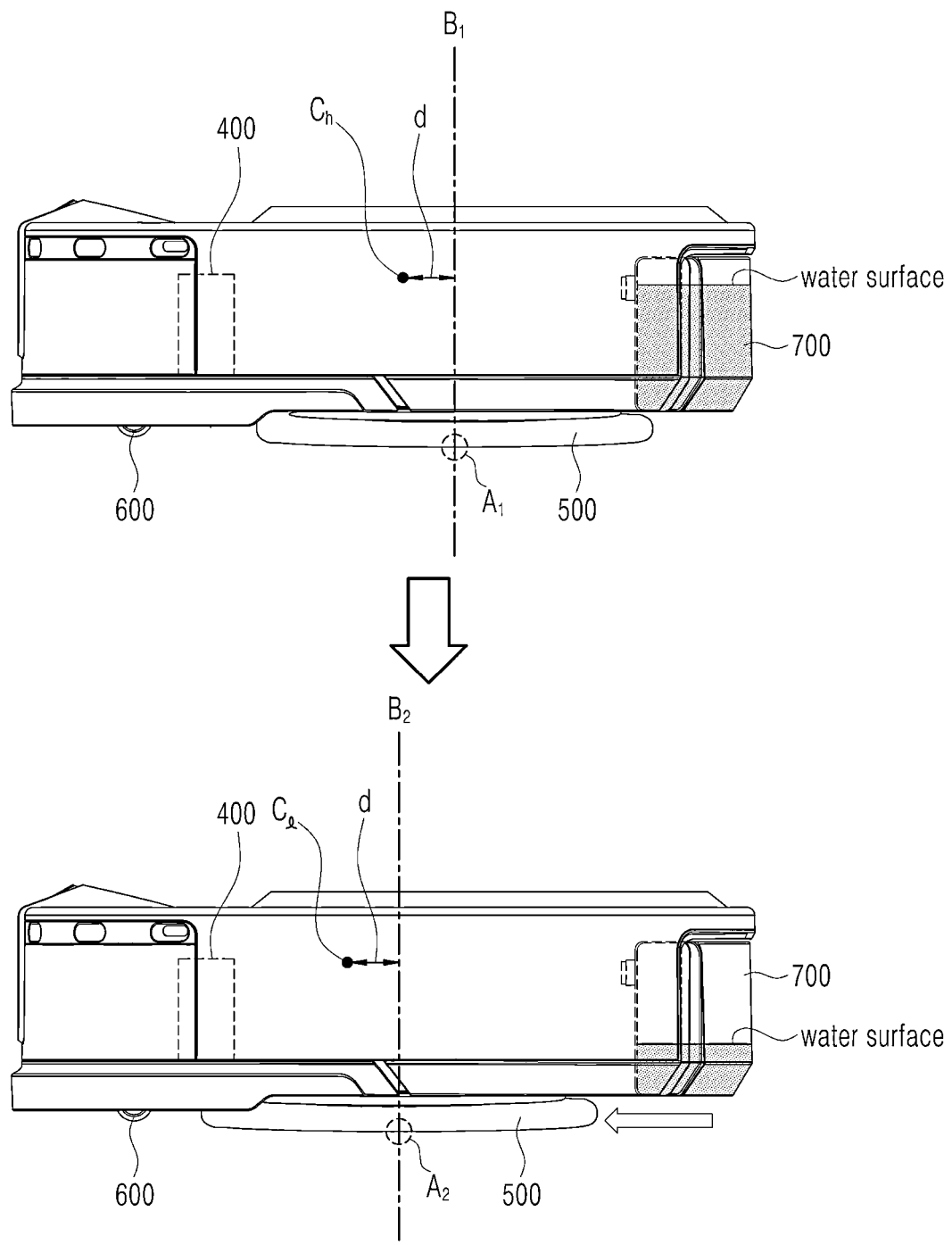
FIG. 16 is a view illustrating a robotic cleaner according to a sixth embodiment of the present disclosure having a moving part, which is configured such that a vertical imaginary plane passing through mop contact portions is spaced a predetermined distance from the center of gravity.

FIG. 16 is a view illustrating a robotic cleaner according to a sixth embodiment of the present disclosure having a moving part, which is configured such that a vertical imaginary plane passing through a mop contact portion is spaced a predetermined distance from the center of gravity.

For example, referring to FIG. 16, in the case where there is much water contained in the water tank 700, the controller 1100 may control the moving part 1200 to move the mop attachment plates 530 such that an imaginary plane B1, which passes through the mop contact portions where the first mop attachment plate 535 and the second mop attachment plate 532 are in contact with a floor surface and is perpendicular to the floor surface, is spaced a first distance apart from the center of gravity $C_h$ of the robotic cleaner 1 to the front.

If the water contained in the water tank 700 is reduced according to the operation of the robotic cleaner 1, the water tank 700 becomes light so that the robotic cleaner 1 may have a new center of gravity $C_1$ shifted forward.

In this case, the controller 1100 may control the moving part 1200 to move the mop attachment plates 530 such that an imaginary plane B2, which passes through the mop contact portions where the first mop attachment plate 535 and the second mop attachment plate 532 are in contact with the floor surface and is perpendicular to the floor surface, is spaced the first distance apart from the new center of gravity $C_1$ of the robotic cleaner 1, which is shifted forward, to the front.

In other words, the controller may control movement of the moving part such that the imaginary plane B2, which passes through the mop contact portions where the first mop attachment plate 535 and the second mop attachment plate 532 are in contact with the floor surface and is perpendicular to the floor surface, is positioned behind the centers of gravity $C_h$ and $C_1$ of the robotic cleaner 1 and such that the vertical distances between the imaginary plane B2 and the centers of gravity $C_h$, and $C_1$ remain the first distance.

The position of the center of gravity $C_h$, or $C_1$ of the robotic cleaner 1 may be detected by the gyro sensor 330 or the like, and the first distance may be 7.5 mm.

With the configuration described above, even if the position of the center of gravity of the robotic cleaner 1 changes because the water in the water tank 700 is consumed according to the operation of the robotic cleaner 1, the mop contact portions may support most of weight of the robotic cleaner 1, thereby effectively scrubbing the floor surface, and the robotic cleaner 1 may travel stably while being supported both by the rolling part 600 and by the mop contact portions.

Hereinafter, the operation and effect of the robotic cleaner of the present disclosure will be described.

When the user operates the robotic cleaner 1, the robotic cleaner 1 travels by itself through a space requiring cleaning on the basis of spatial information detected by the sensor unit 300 so as to scrub a floor surface.

The travelling direction of the robotic cleaner 1 may be controlled by the rotation speeds and directions of the first mop attachment plate 535 and second mop attachment plate 532, and the water tank 700 installed in the robotic cleaner 1 may supply water to the mop such that the mop containing water scrubs the floor surface.

According to the arrangement structure of the battery 400, the water tank 700, and the mop part 500 of the robotic cleaner 1, the mop contact portions having a small area may support all or most of weight of the robotic cleaner 1, thereby effectively scrubbing the floor surface, and the center of gravity may be lowered to increase the restoring force, thereby enabling stable travelling of the robotic cleaner.

In addition, in the case of the robotic cleaner 1 having the moving part 1200, the mop part 500 may be moved such that the mop contact portions may support most of weight of the robotic cleaner 1 in consideration of the center of gravity of which the position changes depending on the weight of the water in the water tank 700, which is consumed according to the operation of the robotic cleaner 1, thereby effectively scrubbing the floor surface.

As described above, the robotic cleaner according to the present disclosure may be configured to scrub a floor surface while the mop contact portions support all the weight of the robotic cleaner so that the frictional force between the mop and the floor surface increases, thereby providing an effect of effectively scrubbing the floor surface.

In addition, the robotic cleaner according to the present disclosure may be configured such that the mop contact portions supporting the weight of the robotic cleaner have a small area so that the frictional force between the mop and the floor surface increases, thereby providing an effect of effectively scrubbing the floor surface.

In addition, the robotic cleaner according to the present disclosure may be configured such that a heavy battery is disposed to be higher in the vertical direction inside the robotic cleaner to control the center of gravity of the robotic cleaner, so that the mop contact portions can easily support all the weight of the robotic cleaner even in the robotic cleaner with a narrow inner space, thereby providing an effect of effectively scrubbing the floor surface.

In addition, the robotic cleaner according to the present disclosure may be configured such that wheels are provided on the bottom surface of the robotic cleaner and such that the mop contact portions are positioned to be closely spaced apart from the vertical axis of the center of gravity of the robotic cleaner in a direction opposite the travelling direction of the robotic cleaner, thereby enabling stable travelling of the robotic cleaner while the mop contact portions maximally support all the weight of the robotic cleaner.

In addition, the robotic cleaner according to the present disclosure may be configured such that a heavy battery and a water tank are disposed to have a lower center of gravity inside the robotic cleaner so that the center of gravity of the robotic cleaner is lowered, thereby providing an effect of increasing the restoring force, so that the robotic cleaner can stably travel while supporting the weight thereof only by the mop contact portions even if the robotic cleaner shakes while travelling.

In addition, the robotic cleaner according to the present disclosure may be configured such that the positions of the mop contact portions are adjusted as the water contained in the water tank of the robotic cleaner is consumed, thereby providing an effect of effectively scrubbing the floor surface over the operation time of the robotic cleaner.

While the invention has been explained in relation to its embodiments above, it is to be understood that various modifications thereof will become apparent to those skilled in the art upon reading the specification without departing the scope of the present disclosure. Therefore, the scope of the present disclosure may be defined not by the detailed description, but by the claims and their equivalents, and all variations within the scope of the claims and their equivalents are to be construed as being included in the present disclosure.

The robotic cleaner according to the embodiment of the present disclosure may be configured to scrub a floor surface while the mop contact portions support all the weight of the robotic cleaner so that the frictional force between the mop and the floor surface increases, thereby providing an effect of effectively scrubbing the floor surface, and thus industrial applicability thereof is remarkable.

What is claimed is:

1. A robotic cleaner that travels by itself and cleans a floor surface, the robotic cleaner comprising:
    a main body comprising a base and a cover covering the base and comprising a battery, a water tank, and a motor inside the same; and
    circular mop attachment plates installed on a bottom surface of the base, to/from which mops are able to be attached/detached, and configured to be rotated by the motor, each of the mops having at least a portion that comes into contact with the floor surface,
    wherein the mop attachment plates comprise a first mop attachment plate installed on a left side to be inclined downwardly to the left side with respect to a forward travelling direction when viewed from above, and a second mop attachment plate installed on a right side to be inclined downwardly to the right side with respect to the forward travelling direction when viewed from above,
    wherein the mops include a first mop configured to be attached to and detached from the first mop attachment plate and a second mop configured to be attached to and detached from the second mop attachment plate, and
    wherein an imaginary plane, which passes through mop contact portions where the first mop and the second mop are in contact with the floor surface and is perpendicular to the floor surface, passes through a center of gravity of the robotic cleaner.

2. The robotic cleaner according to claim 1, wherein the battery is installed on the base such that a height thereof in a direction perpendicular to the floor surface is greater than a length thereof in a direction horizontal to the floor surface.

3. The robotic cleaner according to claim 1, wherein the battery and the water tank are installed on the base such that respective lengths thereof in a direction horizontal to the floor surface are greater than respective heights thereof in a direction perpendicular to the floor surface.

4. The robotic cleaner according to claim 1, further comprising:
    an obstacle detection sensor configured to detect an obstacle in a travelling direction;
    a cliff sensor configured to detect a cliff in the travelling direction; and
    a controller configured to control rotation speeds of the first mop attachment plate and the second mop attachment plate based information detected by the obstacle detection sensor and the cliff sensor.

5. The robotic cleaner according to claim 1, further comprising:
    a manipulation part configured to allow input of power control commands by manipulation of a user;
    a display part configured to display operation information comprising operation time and battery power; and
    a controller configured to control power by information input through the manipulation part and control the display part to display the operation information.

6. A robotic cleaner that travels by itself and cleans a floor surface, the robotic cleaner comprising:
    a main body comprising a base and a cover covering the base, a battery, a water tank, and a motor being positioned inside the main body;
    mop attachment plates installed on the bottom surface of the base, to/from which mops are able to be attached/detached, and configured to be rotated by the motor, each of the mops having at least a portion that comes into contact with the floor surface,
    a moving part configured to move the mop attachment plates in a direction horizontal to the floor surface; and a controller configured to control movement of the moving part, wherein the mop attachment plates comprise a first mop attachment plate installed on a left side to be inclined downwardly to the left side with respect to a forward travelling direction when viewed from above, and a second mop attachment plate installed on a right side to be inclined downwardly to the right side with respect to the forward travelling direction when viewed from above, wherein the mops include a first mop configured to be attached to and detached from the first mop attachment plate, and a second mop configured to be attached to and detached from the second mop attachment plate, and wherein the controller controls the movement of the moving part such that a center of a first imaginary line connecting mop contact portions where the first mop and the second mop attachment plate are respectively in contact with the floor surface is positioned on a second imaginary line, which passes through a center of gravity of the robotic cleaner and is perpendicular to the floor surface.

7. The robotic cleaner according to claim 6, wherein the battery is installed on the base such that a height thereof in a direction perpendicular to the floor surface is greater than a length thereof in a direction horizontal to the floor surface.

8. The robotic cleaner according to claim 6, wherein the moving part comprises a moving motor, and is configured to convert a rotational motion of the moving motor into a linear motion to move the mop attachment plates.

9. The robotic cleaner according to claim 6, further comprising
an obstacle detection sensor configured to detect an obstacle in a travelling direction,
a cliff sensor configured to detect a cliff in the travelling direction, and
a gyro sensor configured to detect the center of gravity,
wherein the controller is configured to control rotation directions of the first mop attachment plate and the second mop attachment plate based on information detected by the obstacle detection sensor and the cliff sensor, and control movement of the moving part based on the center of gravity detected by the gyro sensor.

10. The robotic cleaner according to claim 6, further comprising:
a manipulation part configured to allow input of power control commands by manipulation of a user; and
a display part configured to display operation information comprising operation time and battery power,
wherein the controller is configured to control power by information input through the manipulation part, and control the display part to display the operation information.

11. A robotic cleaner that travels by itself and cleans a floor surface, the robotic cleaner comprising:
a main body comprising a base and a cover covering the base, and a battery, a water tank, and a motor being provided inside the main body;
circular mop attachment plates installed on the bottom surface of the base, to/from which mops are able to be attached/detached, and configured to be rotated by the motor, each of the mops having at least a portion that comes into contact with the floor surface; and
wheels installed on the bottom surface of the base so as to be spaced apart from the mop attachment plates in a forward travelling direction, wherein the mop attachment plates comprise a first mop attachment plate installed on a left side to be inclined downwardly to the left side with respect to the forward travelling direction when viewed from above, and a second mop attachment plate installed on a right side to be inclined downwardly to the right side with respect to the forward travelling direction when viewed from above, wherein the mops comprise a first mop configured to be attached to and detached from the first mop attachment plate, and a second mop configured to be attached to and detached from the second mop attachment plate, and wherein an imaginary plane, which passes through mop contact portions where the first mop and the second mop are in contact with the floor surface and is perpendicular to the floor surface, is positioned behind a center of gravity of the robotic cleaner and such that a horizontal distance between the imaginary plane and the center of gravity remains a first distance.

12. The robotic cleaner according to claim 11, wherein the battery is installed on the base such that a height thereof in a direction perpendicular to the floor surface is greater than a length thereof in a direction horizontal to the floor surface, and
wherein the first distance is 7.5 mm.

13. The robotic cleaner according to claim 11, wherein the battery and the water tank are installed on the base such that lengths thereof in a direction horizontal to the floor surface are greater than heights thereof in a direction perpendicular to the floor surface.

14. The robotic cleaner according to claim 11, further comprising an obstacle detection sensor configured to detect an obstacle in a travelling direction and a cliff sensor configured to detect a cliff in the travelling direction,
wherein the robot cleaner further comprises a controller configured to control rotation directions of the first mop attachment plate and the second mop attachment plate based on information detected by the obstacle detection sensor and the cliff sensor.

15. The robotic cleaner according to claim 11, further comprising:
a manipulation part configured to allow input of power control commands by manipulation of a user;
a display part configured to display operation information comprising operation time and battery power; and
a controller configured to control power by information input through the manipulation part, and control the display part to display operation information.

16. A robotic cleaner that travels by itself and cleans a floor surface, the robotic cleaner comprising:
a main body comprising a base and a cover covering the base, and comprising a battery, a water tank, and a motor inside the same;
circular mop attachment plates installed on the bottom surface of the base, to/from which mops are able to be attached/detached, and configured to be rotated by the motor, and each of the mops having at least a portion that comes into contact with the floor surface;
wheels installed on the bottom surface of the base so as to be spaced apart from the mop attachment plates in a forward travelling direction;
a moving part configured to move the mop attachment plates in a direction horizontal to the floor surface; and
a controller configured to control movement of the moving part, wherein the mop attachment plates comprise a first mop attachment plate installed on a left side to be inclined downwardly to the left side with respect to the forward travelling direction when viewed from above, and a second mop attachment plate installed on a right side to be inclined downwardly to the right side with respect to the forward travelling direction when viewed from above, wherein the mops comprise a first mop configured to be attached to and detached from the first mop attachment plate, and a second mop configured to be attached to and detached from the second mop attachment plate, and wherein the controller is configured to control the movement of the moving part such that a center of a first imaginary line connecting mop contact portions where the first mop and the second mop are respectively in contact with the floor surface is position behind a second imaginary line, which passes through the center of gravity of the robotic cleaner and is perpendicular to the floor surface, and such that horizontal distance between the center of the first imaginary line and the second imaginary line remains a second distance.

17. The robotic cleaner according to claim 16,
wherein the battery is installed on the base such that a height thereof in a direction perpendicular to the floor surface is greater than a length thereof in a direction horizontal to the floor surface, and
wherein the second distance is 7.5 mm.

18. The robotic cleaner according to claim 16,
wherein the moving part comprises a moving motor, and is configured to convert a rotational motion of the moving motor into a linear motion to move the mop attachment plates.

19. The robotic cleaner according to claim 16, further comprising an obstacle detection sensor configured to detect an obstacle in a travelling direction, a cliff sensor configured to detect a cliff in the travelling direction, and a gyro sensor configured to detect the center of gravity,
wherein the controller is configured to control the rotation directions of the first mop attachment plate and the second mop attachment plate on the basis of information detected by the obstacle detection sensor and the cliff sensor, and control movement of the moving part on the basis of the center of gravity detected by the gyro sensor.

20. The robotic cleaner according to claim 16, further comprising:
a manipulation part configured to allow input of power control commands by manipulation of a user; and
a display part configured to display operation information comprising operation time and battery power,
wherein the controller is configured to control power by information input through the manipulation part, and control the display part to display the operation information.

* * * * *